United States Patent

[11] 3,599,504

| [72] | Inventor | Charles F. Taylor<br>Boulder, Colo. |
|---|---|---|
| [21] | Appl. No. | 7,925 |
| [22] | Filed | Feb. 2, 1970 |
| [45] | Patented | Aug. 17, 1971 |
| [73] | Assignee | Borg-Warner Corporation<br>Chicago, Ill. |

[54] AUTOMATIC TRANSMISSION
16 Claims, 12 Drawing Figs.

[52] U.S. Cl. .................................................... 74/230.17 E
[51] Int. Cl. ..................................................... F16h 55/22
[50] Field of Search ........................................... 74/217,
230.7 E, 230.17 R

[56] References Cited
UNITED STATES PATENTS

| 2,553,505 | 5/1951 | Miner | 74/230.17 (E) |
| 2,678,566 | 9/1958 | Oehrli | 74/230.17 (E) |
| 2,852,951 | 9/1958 | Miner | 74/230.17 (A) |
| 2,905,005 | 9/1959 | Miner | 74/230.17 (TL) |
| 2,974,544 | 3/1961 | Miner | 74/230.17 (E) |
| 2,986,043 | 5/1961 | Jaulmes | 74/230.17 (E) |
| 2,987,934 | 6/1961 | Thomas | 74/230.17 (E) |
| 3,394,607 | 7/1968 | Hubert | 74/230.17 (E) |
| 3,491,609 | 1/1970 | Henriksen | 74/230.17 (E) |

OTHER REFERENCES
Morse Chain-Eberhardt-Denver Catalog (Applicant's Non-Pat. Citation) Copyright 1960.

*Primary Examiner*—Leonard H. Gerin
*Attorneys*—Donald W. Banner, William S. McCurry and John W. Butcher ABSTRACT: An automatic transmission assembly comprising a centrifugally responsive unit and a torque-responsive unit connected by a pulley belt in which various elements subjected to stress are constructed of wrought material for ease of manufacturing and for safety, the construction of the units being such to provide positive drive between a driven shaft and a driving shaft.

PATENTED AUG 17 1971
3,599,504
SHEET 1 OF 4
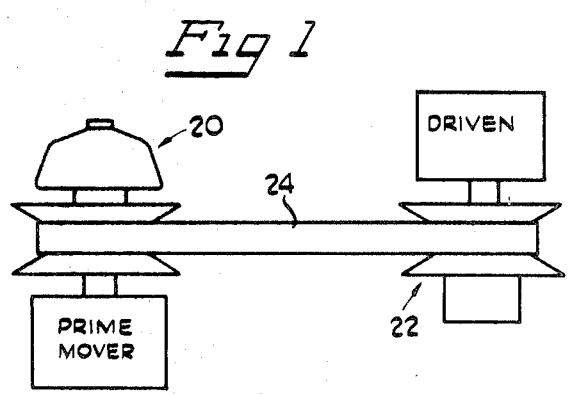
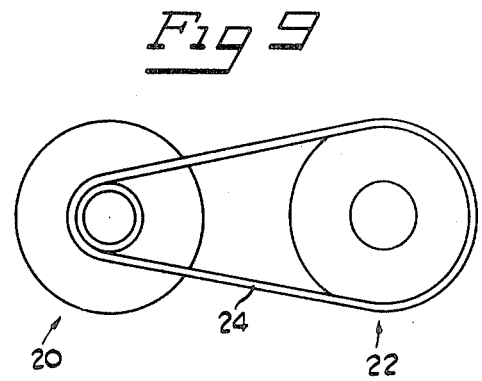
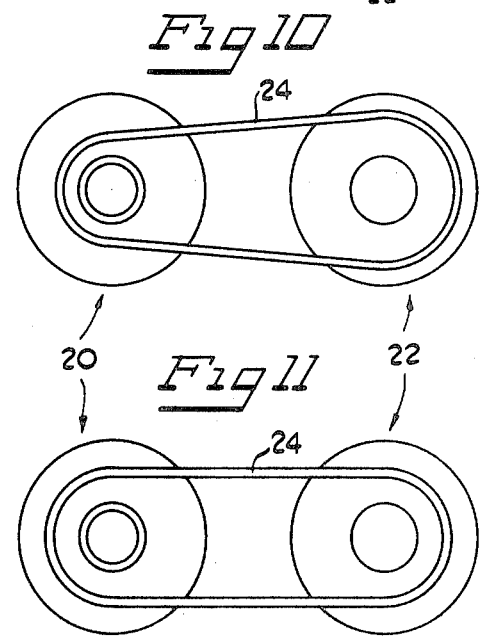
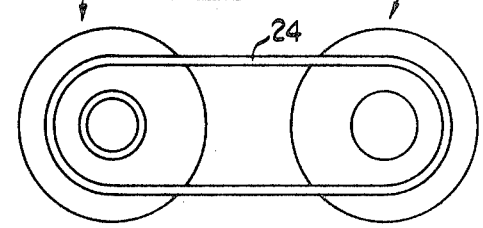
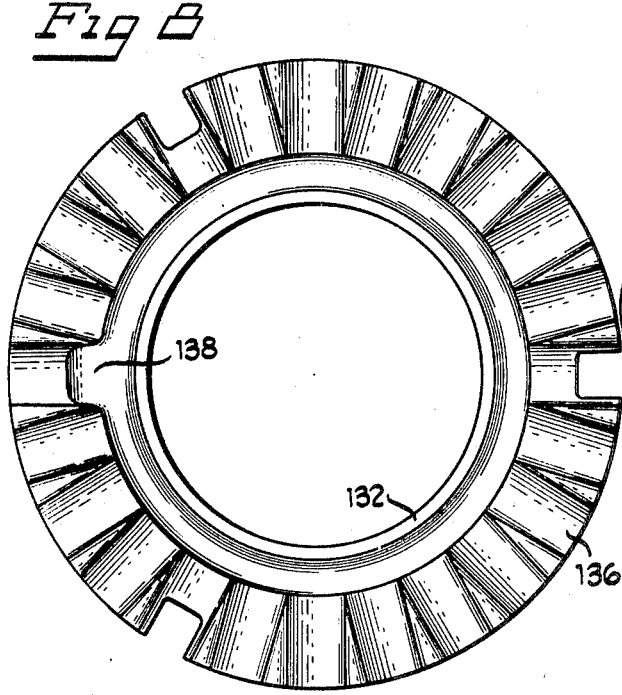
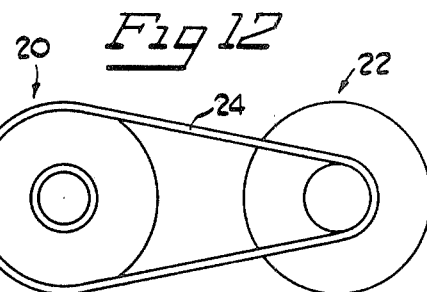
INVENTOR
CHARLES F. TAYLOR
BY *Aubrey L. Burgess*
ATTORNEY INVENTOR
CHARLES F. TAYLOR
BY Aubrey L. Burgess
ATTORNEY

PATENTED AUG 17 1971

INVENTOR
CHARLES F. TAYLOR

BY Aubrey L. Burgen
ATTORNEY 3,599,504

1

AUTOMATIC TRANSMISSION

BACKGROUND OF THE INVENTION

Automatic transmissions which include a centrifugally responsive unit and a torque responsive unit are well known in the art. They find use in various vehicles such as tractors, golf carts, fork trucks, snowmobiles, all terrain vehicles and the like in which a relatively simple but positive automatic transmission is desired. In these transmissions speed changes occur automatically as the speed of the driver increases without the necessity of using expensive gearing and hydraulic controls.

The centrifugally responsive unit is usually mounted directly on the engine or driving means crankshaft and the stepless ratios provided by this unit are controlled by centrifugal forces acting on a number of large steel balls operating in restrictive channels. As the engine throttle is opened, the balls force a movable pulley flange toward a fixed pulley flange and against a driving belt, thus engaging the belt in a smooth clutching action. With increasing engine speeds, the balls force the movable pulley flange toward the fixed pulley flange increasing the pulley pitch diameter and shifting the drive to higher ratios.

The total forces exerted by the balls is equal to the sum of the axial force components of the individual balls. They maintain a constant force on the movable pulley flange giving nonslipping belt grip, smooth ratio changes, and full power transmission.

The torque responsive unit is a torque-sensitive variable pitch member, which maintains an equilibrium condition with the centrifugally responsive unit at all times. Pressure on the pulley flange varies directly with torque, so that the drive downshifts ratio with increased torque demand without appreciable loss of engine speed.

The torque-responsive unit includes sliding flange spiral cams and followers which are activated by torque demands through belt traction on one flange. The gripping action of the unit enables the transmitting of higher torques without slip and reduces initial belt tension. The cam action enables carrying maximum horsepower at the lowest pulley diameter. The spring therein is used only to assure constant belt contact under all operating conditions.

Generally, many elements of the drive and driven units, i.e., the centrifugal and torque units, are cast of various metals and include improperly secured loose parts, and at times, under operating conditions, such castings fail, causing damage to the device in which the units are used and requiring replacement of parts so that the device is operable.

According to this invention, a transmission assembly includes a centrifugal driving assembly and a torque-driven assembly connected respectively to a driving shaft and a driven shaft with a pulley belt therebetween.

The centrifugal driving assembly comprises a driving pulley having a pair of pulley flanges defining a substantially V-shaped space therebetween for receiving the pulley belt, one of said pulley flanges being drivingly connected to said driving shaft and the other of said pulley flanges being movable axially with respect to said driving shaft from an idle position to active positions whereby the spacing of said pulley flanges defines the effective diameter of said pulley, the movable pulley flange having a hub spaced from and surrounding said driving shaft. An idler ring surrounds the driving shaft and is freely rotatable therearound for engagement with the pulley belt when the pulley is in its idle position. A cover or shroud is connected to the driving shaft and is formed with a plurality of races therein. A flanged carrier surrounds the hub and is fixed thereto, and means are provided for biasing the retainer and the movable pulley flange axially toward the shroud. A plurality of flyweights, such as balls, is located between said retainer and the shroud and are movable in said races outwardly of said driving shaft by centrifugal force as said driving shaft rotates against the force of the biasing means to move the retainer and the movable pulley flange axially with respect to the fixed pulley flange to modify the effective diameter of said pulley.

The torque driven assembly comprises a driven pulley having a pair of pulley flanges defining a substantially V-shaped space therebetween for receiving the pulley belt, one of the pulley flanges being connected to said driven shaft and the other of said pulley flanges being axially movable with respect thereto from an idle position to active positions in response to modifications in the effective diameter of said driving pulley. A sleeve is fixed to the driven shaft and to the connected pulley flange to form the connection between the pulley flange and the driven shaft. The connected pulley flange has a cylindrical portion spaced from and surrounding the sleeve with an inwardly directed element, as for example and inwardly turned tang portion and inwardly directed angled cam elements. A flanged cylindrical member surrounds the sleeve and is axially movable with respect thereto and is provided with outwardly directed cam followers for engagement with the cam elements. The movable pulley flange is connected to the flange of the flanged cylindrical member for axial movement therewith.

A torsion and compression spring is provided for the flanged cylindrical member and the pulley flange connected thereto in a direction toward the fixed pulley flange and for applying a torque thereto. A spring retainer surrounds the flanged cylindrical member and is provided with a notched, outwardly directed flange portion whereupon the torque applied by said spring is variable by rotation of the spring retainer to engage a different notch with the tang.

The transmission of this invention is primarily constructed of parts which are stamped, pressed and/or formed of wrought metal found to be durable under various conditions of use. The outer rim of the drive cover or shroud, constructed with raceways to guide the balls, is provided with a flanged-over outer rim to prevent the escape of the balls or flyweights in the event of damage or malfunction. Bearings are generally constructed of bronze or the like, in accordance with good engineering practice.

A positive drive to the drive unit from the prime mover is provided by the construction of the connection of the centrifugal unit to the prime mover. Tangs or the like and a folded edge on washers under the head of the through bolt, i.e., that bolt which connects the driver unit to the driver, tightens the connection when the engine fires. With such connection, no loss of drive can occur.

In the driven unit, the cams, followers, torsion spring and spring retainer are enclosed and protected. Wrought metal construction permits this type of construction and protection which is more reliable than the usual metal castings. Provision is also made for easily adjusting the torsion of the torsion spring, as is necessary under various conditions of use.

THE DRAWINGS

FIG. 1 is an elevational view of transmission, constructed according to this invention;

FIG. 8 is a plan view of the spring retainer of the torque-responsive unit of the transmission; and FIGS. 9, 10, 11 and 12 are diagrammatic views showing various driving connections between the centrifugally responsive and torque-responsive units of the invention.

THE PREFERRED EMBODIMENT

Figure 2:
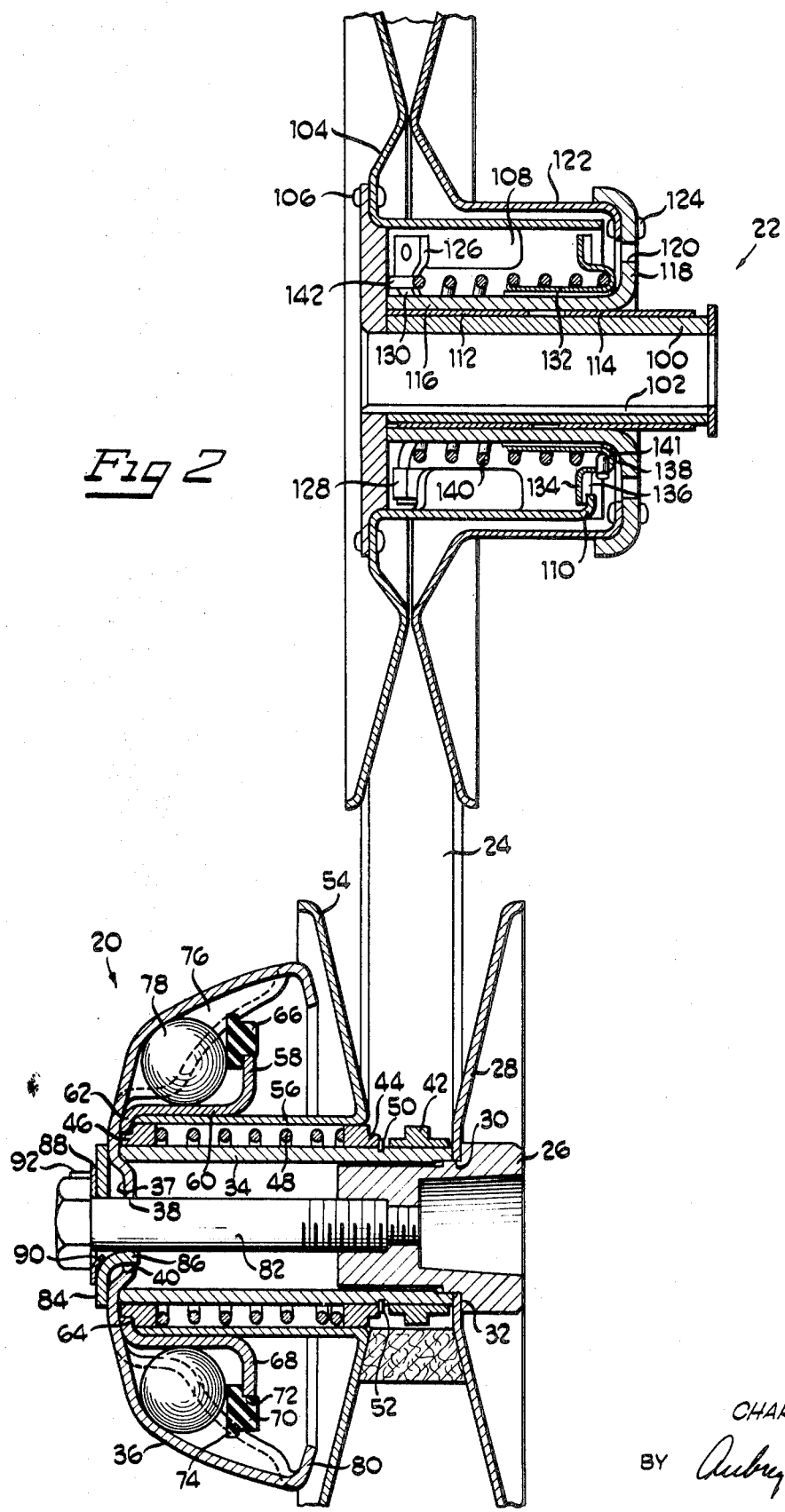
FIG. 2 is a sectional view of the transmission of FIG. 1 with the centrifugally responsive unit in inactive position.
Figure 3:
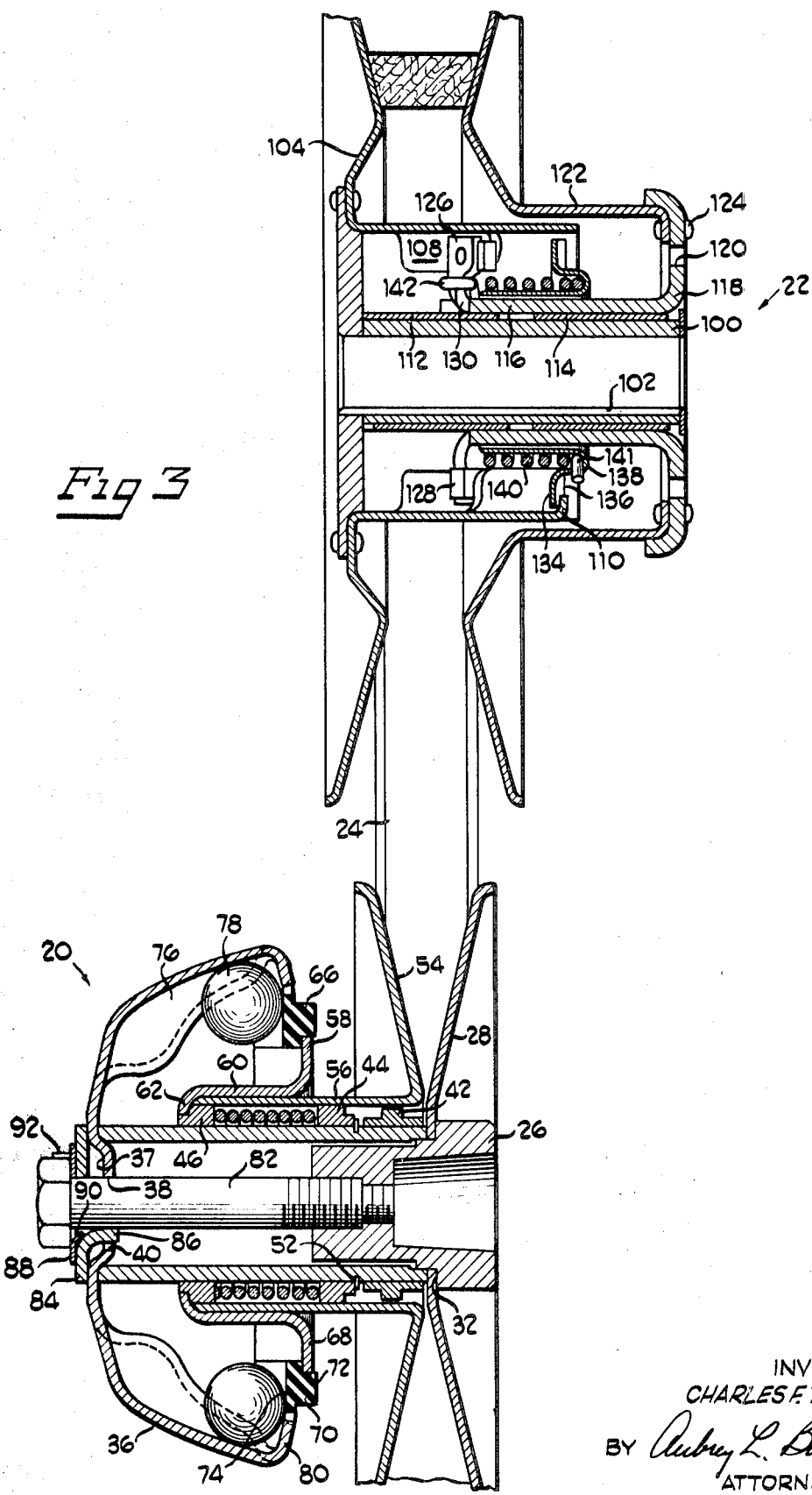
FIG. 3 is a sectional view of the transmission of FIG. 1 with the centrifugally responsive unit in an active position.
Figure 4:
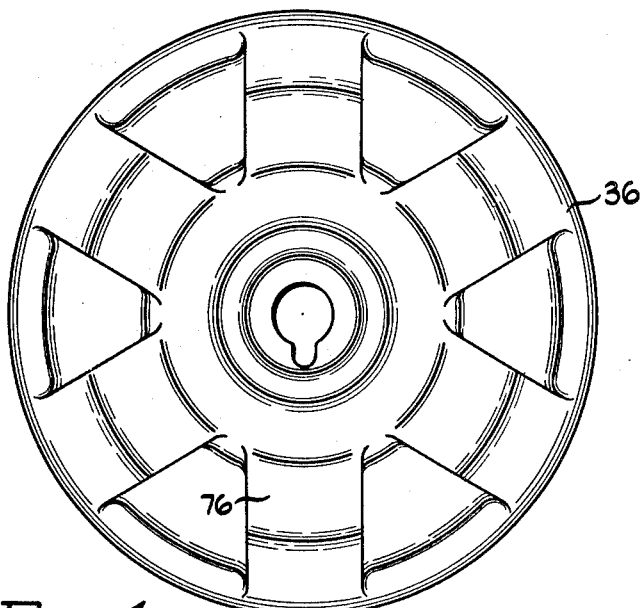
FIG. 4 is a plan view of the drive cover or shroud of the centrifugally responsive unit of the transmission.
Figure 6:
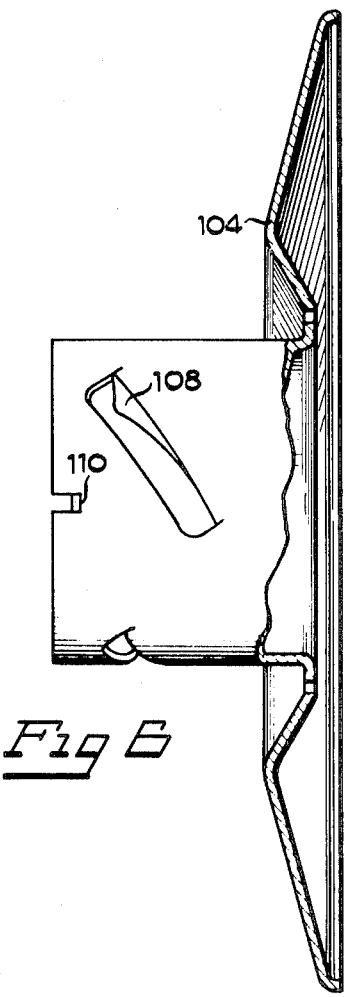
FIG. 6 is a side view of the fixed flange-cam hub of the torque-responsive unit of the transmission.

Attention is directed to FIG. 1 which shows a transmission including a centrifugally responsive unit 20 and a torque-responsive unit 22, the driving connection therebetween being by means of a pulley belt 24. Generally, the centrifugal unit 20 is connected to the crankshaft of a prime mover, such as a gasoline engine, indicated by legend. The centrifugal unit 20 thus becomes the driver unit and the torque unit 22 is connected to that which is to be driven and becomes the driven unit.

The centrifugal unit or driver 20 has a hub 26 for connection to the crankshaft of the prime mover, and a fixed pulley flange 28, having a central opening 30 received on a shoulder 32 of the hub 26. One end of a hub tube 34, which partially surrounds the hub 26, abuts the pulley flange 28, while a mushroom-shaped drive cover or shroud 36 abuts the other end of the hub tube 34. The drive cover 36 is dished as at 37 with a central opening 38 therethrough, notched as at 40. Surrounding the hub tube 34 is an idler ring 42 which is freely rotatable thereabout. Also, surrounding the hub tube 34 are spaced bushings 44 and 46 with a compression spring 48 therebetween. The spring 48 urges the bushings away from each other, the bushing 44 abutting a retainer or snapring 50 received in a slot 52 in the hub tube 34. The other bushing 46 is movable, as will be explained, between a position abutting the drive cover 36 and other positions removed therefrom.

A sliding flange assembly which includes a sliding flange 54 having a cylindrical portion 56 and a flanged carrier 58 surrounds the hub tube 34. The part 58 has a portion 60 press fitted to the portion 56 and an inwardly directed edge 62 received in a notch 64 in the bushing 46. The portion 56 is arranged to move relative to the bushing 44.

Figure 5:
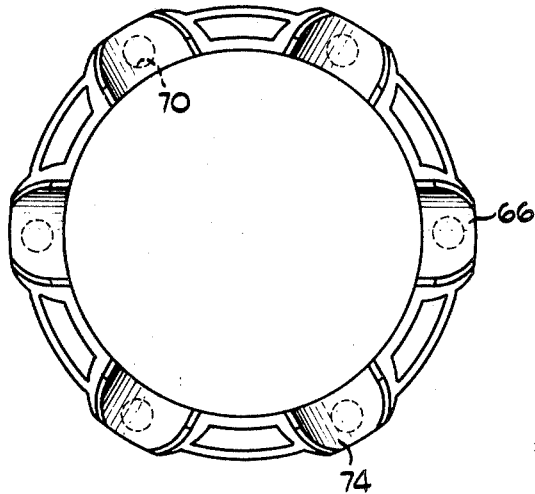
FIG. 5 is a plan view of a drive liner of the centrifugally responsive unit of the transmission.
Figure 7:
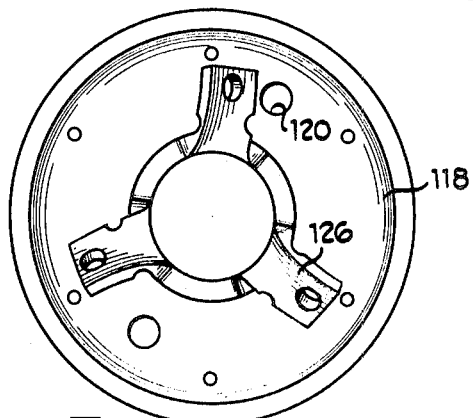
FIG. 7 is a plan view of the sliding cam of the torque-responsive unit of the transmission without cam pads thereon.

A substantially circular drive liner 66 (See also FIG. 5) generally constructed of a reinforced plastic, such as glass fiber reinforced nylon, is received on an outwardly extending flange 68 of the flanged carrier 58 and has protruding parts 70 receivable in openings 72 in the flange 68, thus locking the liner 66 to the flange 68. The drive liner 66 is shaped to have spaced depressed guide channels 74 therearound for a purpose to be described.

The drive cover 36 is shaped to provide a plurality of spaced guide channels or races 76, corresponding in number and arrangement with the guide channels 74 of the liner 66. Between the liner 66 and the cover 36 and within a selected number of composite channels formed by the guide channels 74 and 76 are flyweight balls 78. The balls 78 are generally made of hardened steel. The number of balls 78 is chosen for dynamic balance.

The drive cover 36 is also shaped with an inwardly turned lower edge 80 and is connected to the hub 26 by means of a bolt 82. Between the head of the bolt 82 and the top of the drive cover 36 is a washer 84 having a tang 86 which fits within the notch 40 of the cover 76, and there is also provided a lock washer 88 with a tang 90 arranged complimentary to the tang 86. One peripheral portion of the lock washer 88 is turned into engagement with the head of the bolt 82 as indicated at 92. Centering of the cover 36 is assured by the dish shape 37. This composite connection is such to insure positive drive between the hub 26 and the remaining parts of the unit. The hub 26 is suitably connected to the prime mover.

It will be noted that all actuating parts of the unit 20 are enclosed.

The torque unit 22 comprises a flanged cylindrical sleeve 100 having a keyway 102 therein which is adapted to be drivingly connected by means of a key (not shown) to a shaft (also not shown) of the device to be driven. A fixed flange-cam hub 104 is connected, as by connectors 106, to the flanged sleeve 100, the flange-cam hub 104 being formed with inwardly and angularly directed spaced cams 108 and an inwardly directed tang 110 for purposes to be later described. A pair of spaced cylindrical bushings 112 and 114 surround the sleeve 100 and there is a flanged, substantially cylindrical sliding member 116 surrounding the bushing 112 and 114 and slidable axially with respect thereto. The flange portion 118 of the member 116 is provided with a plurality of openings 120 therethrough and has a sliding flange 122 connected thereto by connectors 124. The end of the member 116 opposite the openings 120 is formed to provide cam followers 126 corresponding in number and spacing with the cams 108, and each follower has a cam pad 128 of the cams 108, or the like attached thereto for engagement with its respective cam 108. The followers 126 are joined to the member 116 by neckline portions 130.

The slope of the cams 108 is chosen for various drive conditions and flange pressure. For example, a relatively steep cam slope provides greater flange pressures and also a move rapid downshift as the load on the torque-responsive unit is increased. This can occur when the vehicle in which the transmission is installed goes from flat terrain to hilly terrain or to a difficult terrain.

Surrounding the member 116 is a cylindrical, flanged spring retainer 132, the flange 134 of which is fluted as at 136 and apertured as at 138. The tang 110 of the fixed flange-cam hub 104 engages one of the flutes 136. Instead of a tang 110, 2 pin or other projection can be used to engage a flute 136. A torsion-compression spring 140 is received around the spring retainer 132 with tang ends 141,142 received in the aperture 138 and over the neck 130, respectively. Thus the spring 140 is compressed as the fixed and sliding flanges move apart. The torsion force of the spring 140 can be varied by rotating the spring retainer 132 relative to the fixed flange-cam hub 104. This is accomplished by inserting a tool, such as a screwdriver, through an opening 120 into engagement with the flutes 136 and rotating the spring retainer 132 to engage a different flute with the tang 110.

The actuating parts of the unit 22 are enclosed.

With the exception of the bearings, such as bearings 112 and 114, the balls in the centrifugal unit, and the springs in both the units, the parts are made of wrought steel which is punched and shaped into the finished parts. One method of shaping is by spinning the punched parts. Other methods of shaping can also be used.

OPERATION

FIGS. 9, 10, 11 and 12 illustrate various drive conditions between the centrifugal unit 20, referred to at times as the driver, and the torque unit 22, referred to at times as the driven.

With the engine or prime mover at idling speed, (FIG. 9) the drive belt runs free on the idler ring 42 and no power is transmitted. The driven flange is in the position shown in FIG. 2.

As the throttle of the prime mover is advanced, the flanges of the driver or centrifugal unit are closed and engage the belt. The positive belt grip of both units eliminates belt slippage after engagement and full engine power is transmitted by the belt. The condition of the units at relatively low engine speeds is illustrated by FIG. 10.

At intermediate speeds, see FIG. 11, the throttle of the prime mover is advanced and the effective diameters of the belt pulleys of the units change in accordance with acceleration. The effective diameter of the driver pulley increases and the effective diameter of the driven pulley decreases.

High speed operation is illustrated by FIG. 12. At high speeds, the belt is at the outside diameter of the driver unit and at the inside diameter of the driven unit.

Under heavy load the belt will quickly shift to the inside diameter of the driver and to the outside diameter of the driven unit, returning to the normal high-speed condition as load returns to normal.

For all conditions, the drive ratios are stepless; full power, at any speed, is transmitted without belt slippage or loss of efficiency.

What I claim is:

1. A transmission assembly comprising:

a centrifugally responsive assembly and a torque-responsive assembly connected respectively to a driving shaft and a driven shaft with a pulley belt therebetween;

said centrifugal assembly comprising; a driving pulley comprising a pair of pulley flanges, one of said pulley flanges being movable axially with respect to said driving shaft from an idle position to active positions whereby the spacing of said pulley flanges defines the effective diameter of said pulley;

a shroud connected to said driving shaft and having a plurality of races therein;

a flanged carrier surrounding said driving shaft;

means biasing said carrier and said movable pulley flange axially toward said shroud;

a plurality of flyweights between said carrier and said shroud movable in said races outwardly of said driving shaft by centrifugal force as said driving shaft rotates and against the force of said biasing means to thereby move said carrier and said movable pulley flange axially with respect to said other pulley flange to thereby modify the effective diameter of said pulley;

said torque assembly comprising; a driven pulley comprising a pair of pulley flanges, one of said pulley flanges being connected to said driven shaft and the other of said pulley flanges being axially movable with respect thereto from an idle position to active positions in response to modifications in the effective diameter of said driving pulley;

a sleeve fixed to said driven shaft and to said connected pulley flange;

said connected pulley flange having a cylindrical portion spaced from and surrounding said sleeve;

said cylindrical portion having an inwardly directed element;

a flanged cylindrical member surrounding said sleeve and axially movable with respect thereto;

said flanged cylindrical member and said cylindrical portion being provided with cooperating cam means;

said movable pulley flange being connected to the flange of said flanged cylindrical member for axial movement therewith;

a torsion and compression spring biasing said flanged cylindrical member and said pulley flange connected thereto in a direction toward said other pulley flange and applying a torque thereto;

a spring retainer surrounding said flanged cylindrical member and being provided with a fluted, outwardly directed flange portion whereupon the torque applied by said spring is variable by rotation of said spring retainer to engage a different flute with said inwardly directed element.

2. A transmission assembly as recited in claim 1 wherein said inwardly directed element is an inwardly directed tang portion.

3. A transmission assembly comprising:

a centrifugal driving assembly and a torque-driven assembly connected respectively to a driving shaft and a driven shaft with a pulley belt therebetween;

said centrifugal driving assembly comprising; a driving pulley comprising a pair of pulley flanges defining a substantially V-shaped space therebetween for receiving said pulley belt, one of said pulley flanges being drivingly connected to said driving shaft and the other of said pulley flanges being movable axially with respect to said driving shaft from an idle position to active positions whereby the spacing of said pulley flanges defines the effective diameter of said pulley;

said movable pulley flange having a hub spaced from and surrounding said driving shaft;

an idler ring surrounding said driving shaft and freely rotatable therearound for engagement with said belt when said pulley is in idle position;

a shroud connected to said driving shaft and having a plurality of races therein;

a flanged carrier surrounding said hub and fixed thereto;

means biasing said carrier and said movable pulley flange axially toward said shroud;

a plurality of flyweights between said carrier and said shroud movable in said races outwardly of said driving shaft by centrifugal force as said driving shaft rotates and against the force of said biasing means to thereby move said carrier and said movable pulley flange axially with respect to said fixed pulley flange to thereby modify the effective diameter of said pulley;

said torque-driven assembly comprising; a driven pulley comprising a pair of pulley flanges defining a substantially V-shaped space therebetween for receiving said pulley belt, one of said pulley flanges being connected to said driven shaft and the other of said pulley flanges being axially movable with respect thereto from an idle position to active positions in response to modifications in the effective diameter of said driving pulley;

a sleeve fixed to said driven shaft and to said connected pulley flange and forming the connection between said pulley flange and said driven shaft;

said connected pulley flange having a cylindrical portion spaced from and surrounding said sleeve;

said cylindrical portion having an inwardly turned tang portion and inwardly directed angled cam elements;

a flanged cylindrical member surrounding said sleeve and axially movable with respect thereto;

said flanged cylindrical member being provided with outwardly directed cam followers for engagement with said cam elements;

said movable pulley flange being connected to the flange of said flanged cylindrical member for axial movement therewith;

a torsion and compression spring biasing said flanged cylindrical member and said pulley flange connected thereto in a direction toward said fixed pulley flange and applying a torque thereto;

a spring retainer surrounding said flanged cylindrical member and being provided with a fluted, outwardly directed flange portion whereupon the torque applied by said spring is variable by rotation of said spring retainer to engage a different flute with said tang.

4. A transmission assembly as recited in claim 3 further including a positive connection between the driving shaft and the centrifugally responsive assembly comprising:

means defining a notch in said shroud or cover;

a washer having a tang portion extending from its plane and received in said notch; and a bolt connected to said driving shaft urging said washer toward said cover.

5. A transmission assembly as recited in claim 4 wherein said shroud has a dished-shaped portion adjacent said notch whereby centering of said shroud is enhanced.

6. A transmission assembly as recited in claim 3 further including a positive connection between the driving shaft and the centrifugally responsive assembly comprising:

means defining a notch in said shroud or cover;

a washer having a tang portion extending from its plane and received in said notch;

a lock washer having a tang extending from its plane and engaging said tang portion of said washer;

a bolt having a faceted head connected to said driving shaft urging said washers toward said cover; and a peripheral turned edge portion of said lock washer engaging a facet of said bolt head.

7. A transmission assembly as recited in claim 3 further including a portion of said shroud or cover directed inwardly toward said shaft.

8. A transmission assembly as recited in claim 7 further including a positive connection between the driving shaft and the centrifugally responsive assembly comprising:

means defining a notch in said shroud or cover;

a washer having a tang portion extending from its plane and received in said notch; and a bolt connected to said driving shaft urging said washer toward said cover.

9. A transmission assembly as recited in claim 8 wherein said shroud has a dished-shaped portion adjacent said notch whereby centering of said shroud is enhanced.

10. A transmission assembly as recited in claim 3 in which said shroud or cover is constructed of wrought steel.

11. A transmission assembly comprising:
a centrifugally responsive assembly and a torque-responsive assembly connected respectively to a driving shaft and a driven shaft with a pulley belt therebetween;
said centrifugal assembly comprising; a driving pulley comprising a pair of pulley flanges defining a substantially V-shaped space therebetween for receiving said pulley belt, one of said pulley flanges being drivingly connected to said driving shaft and the other of said pulley flanges being movable axially with respect to said driving shaft from an idle position to active positions whereby the spacing of said pulley flanges defines the effective diameter of said pulley;
said movable pulley flange having a hub spaced from and surrounding said driving shaft;
a shroud or cover connected to said driving shaft and having a plurality of races therein;
a flanged carrier surrounding said hub and fixed thereto;
means biasing said carrier and said movable pulley flange axially toward said shroud or cover;
a plurality of flyweight balls between said carrier and said shroud or cover movable in said races outwardly of said driving shaft by centrifugal force as said driving shaft rotates and against the force of said biasing means to thereby move said carrier and said movable pulley flange axially with respect to said fixed pulley flange to thereby modify the effective diameter of said pulley.

12. A transmission assembly as recited in claim 11 further including a positive connection between the driving shaft and the centrifugally responsive assembly comprising:
means defining a notch in said shroud or cover;
a washer having a tang portion extending from its plane and received in said notch;
a lock washer having a tang extending from its plane and engaging said tang portion of said washer;
a bolt having a faceted head connected to said driving shaft urging said washers toward said cover; and
a peripheral turned edge portion of said lock washer engaging a facet of said bolt head.

13. A transmission assembly as recited in claim 11 further including a portion of said shroud or cover directed inwardly toward said shaft.

14. A transmission assembly as recited in claim 11 which said shroud or cover is constructed of wrought steel.

15. A transmission assembly comprising:
a centrifugally responsive assembly and a torque-responsive assembly connected respectively to a driving shaft and a driving shaft with a pulley belt therebetween;
said torque assembly comprising; a driven pulley comprising a pair of pulley flanges defining a substantially V-shaped space therebetween for receiving said pulley belt, one of said pulley flanges being connected to said driven shaft and the other of said pulley flanges being axially movable with respect thereto from an idle position to active positions in response to modifications in the effective diameter of said driving pulley;
a sleeve fixed to said driven shaft and to said connected pulley flange and forming the connection between said pulley flange and said driven shaft;
said connected pulley flange having a cylindrical portion spaced from and surrounding said sleeve;
said cylindrical portion having an inwardly directed element and inwardly directed angled cam elements;
a flanged cylindrical member surrounding said sleeve and axially movable with respect thereto;
said flanged cylindrical member being provided with outwardly directed cam followers for engagement with said cam elements;
said movable pulley flange being connected to the flange of said flanged cylindrical member for axial movement therewith;
a torsion and compression spring biasing said flanged cylindrical member and said pulley flange connected thereto in a direction toward said fixed pulley flange and applying a torque thereto;
a spring retainer surrounding said flanged cylindrical member and being provided with a fluted, outwardly directed flange portion whereupon the torque applied by said spring is variable by rotation of said spring retainer to engage a different flute with said inwardly directed element.

16. A transmission assembly as recited in claim 15 in which said inwardly directed element is an inwardly turned tang portion.